(12) United States Patent
Chen et al.

(10) Patent No.: US 8,801,350 B2
(45) Date of Patent: *Aug. 12, 2014

(54) LOCKING AND UNLOCKING NUT STRUCTURE

(76) Inventors: I-Fu Chen, Taichung (TW); Chi-Chuan Chen, Lukang Township, Changhua County (TW)

( * ) Notice: Subject to any disclaimer, the term of this patent is extended or adjusted under 35 U.S.C. 154(b) by 175 days.

This patent is subject to a terminal disclaimer.

(21) Appl. No.: 13/453,390

(22) Filed: Apr. 23, 2012

(65) Prior Publication Data
US 2013/0280007 A1    Oct. 24, 2013

(51) Int. Cl.
*F16B 37/08*    (2006.01)

(52) U.S. Cl.
USPC .......................................... 411/221; 411/432

(58) Field of Classification Search
USPC ......... 411/221, 246, 248, 249, 254, 256, 432, 411/433; 285/34
See application file for complete search history.

(56) References Cited

U.S. PATENT DOCUMENTS

| | | | | | |
|---|---|---|---|---|---|
| 2,267,252 A | * | 12/1941 | Pitsch | ............................. | 285/34 |
| 3,390,898 A | * | 7/1968 | Sumida | ........................... | 285/34 |
| 4,569,242 A | * | 2/1986 | Hu | .............................. | 74/424.95 |
| 4,802,804 A | * | 2/1989 | Hirohata | ........................ | 411/433 |
| 4,930,961 A | * | 6/1990 | Weis | ............................... | 411/266 |
| 5,755,544 A | * | 5/1998 | Muller et al. | .................. | 411/433 |
| 5,944,467 A | * | 8/1999 | Yuta | ............................... | 411/433 |

* cited by examiner

*Primary Examiner* — Gary Estremsky

(57) ABSTRACT

A locking and unlocking nut structure contains a body including a through hole, a diameter of the through hole being larger than that of a screw rod (tube), the body also including a semi-circular recess with a starting segment and a stopping segment, the body further including a slot and an diameter-decreased screw section; a slidable block retained in the semi-circular recess and moving between the starting segment and the stopping segment, the slidable block including first threads, while the slidable block is fixed on the starting segment, a distance from the first threads of the slidable block to an inner wall of the through hole is larger than an outer diameter of the screw rod (tube); while the slidable block is fixed on the stopping segment, a distance from the first threads to the diameter-decreased screw section is equal to the outer diameter of the screw rod (tube).

10 Claims, 7 Drawing Sheets

LOCKING AND UNLOCKING NUT STRUCTURE

FIELD OF THE INVENTION

The present invention relates to a locking and unlocking structure which is capable of screwing with a screw rod (tube) and unscrewing from the screw rod (tube) quickly and easily.

BACKGROUND OF THE INVENTION

A conventional nut is used to screw with a screw rod (or tube), and it is fitted into a fixing position of the screw rod (tube) from a distal end of the screw rod (tube) and then is screwed with the screw rod (tube) by rotating the nut tightly.

However, it is time-consuming during rotating the nut tightly or loosely, and the longer the screw rod (tube) is, the more time consumes.

Besides, if screwing the nut with the screw rod (tube) or unscrewing the nut from the screw rod (tube) in a limited space, such as water supply device of washstand or pipeline in a machine, it is difficult to choose a suitable tool to rotate the nut in the limited space, or the use has to change operation gestures constantly, thus having inconvenient operation.

The present invention has arisen to mitigate and/or obviate the afore-described disadvantages.

SUMMARY OF THE INVENTION

The primary object of the present invention is to provide a locking and unlocking structure which is capable of screwing with a screw rod (tube) and unscrewing from the screw rod (tube) and easily.

Another primary object of the present invention is to provide a locking and unlocking structure which is capable of screwing with a screw rod (tube) and unscrewing from the screw rod (tube) and quickly to save operating time.

To obtain the above objectives, a locking and unlocking structure provided by the present invention contains:

a body including a through hole passing therethrough axially, a diameter of the through hole being larger than that of a screw rod (tube), the body also including a semi-circular recess defined on a top surface thereof, and the semi-circular recess having a starting segment defined on one end thereof and a stopping segment defined on another end thereof, the body further including a slot formed around an upper end thereof relative to the semi-circular recess and an diameter-decreased screw section defined on the inner wall of the through hole thereof opposite to on an inner rim of the stopping segment of the semi-circular recess;

a slidable block formed in a C shape and retained in the semi-circular recess and guided by the slot to move between the starting segment and the stopping segment of the semi-circular recess, the slidable block including first threads defined on one of two outer surfaces thereof, while the slidable block is fixed on the starting segment of the semi-circular recess, a distance from the first threads of the slidable block to an inner wall of the through hole is larger than an outer diameter of the screw rod (tube); while the slidable block is fixed on the stopping segment of the semi-circular recess, a distance from the first threads to the diameter-decreased screw section of the through hole is equal to the outer diameter of the screw rod (tube);

the screw rod (tube) including second threads to match with the diameter-decreased screw section and the first threads of the slidable block.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
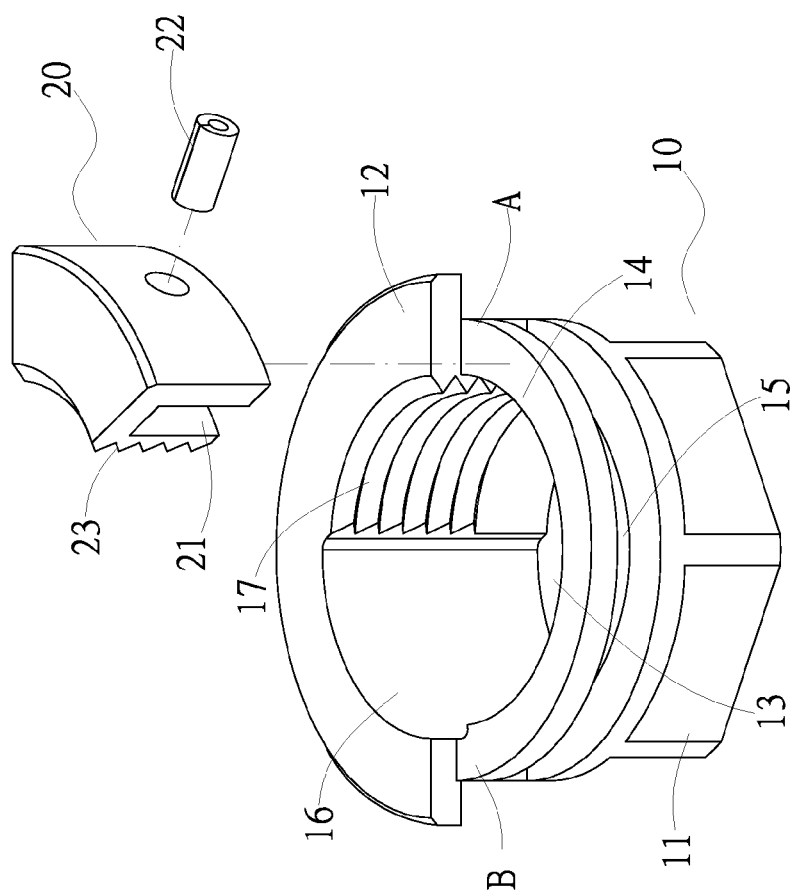
FIG. 1 is a perspective view showing the exploded components of a locking and unlocking nut structure according to a preferred embodiment of the present invention.
Figure 2:
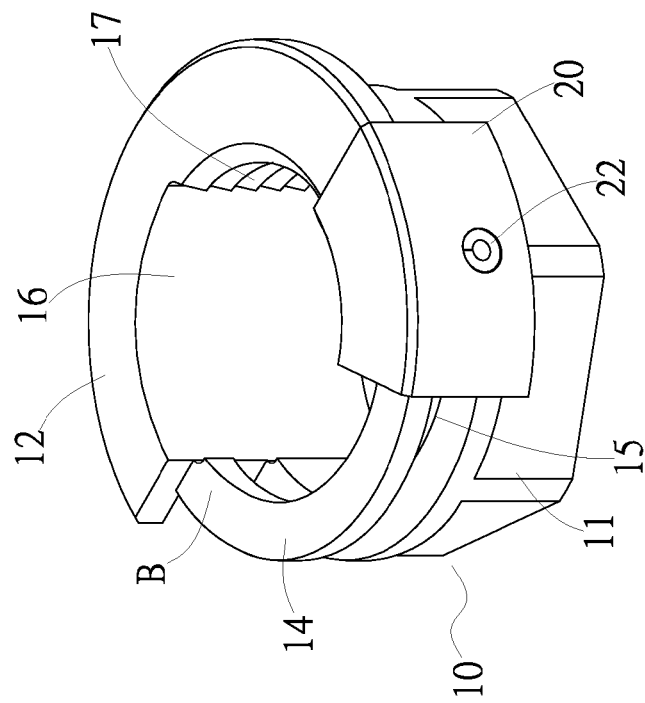
FIG. 2 is a perspective view showing the assembly of the locking and unlocking nut structure according to the preferred embodiment of the present invention.
Figure 3:
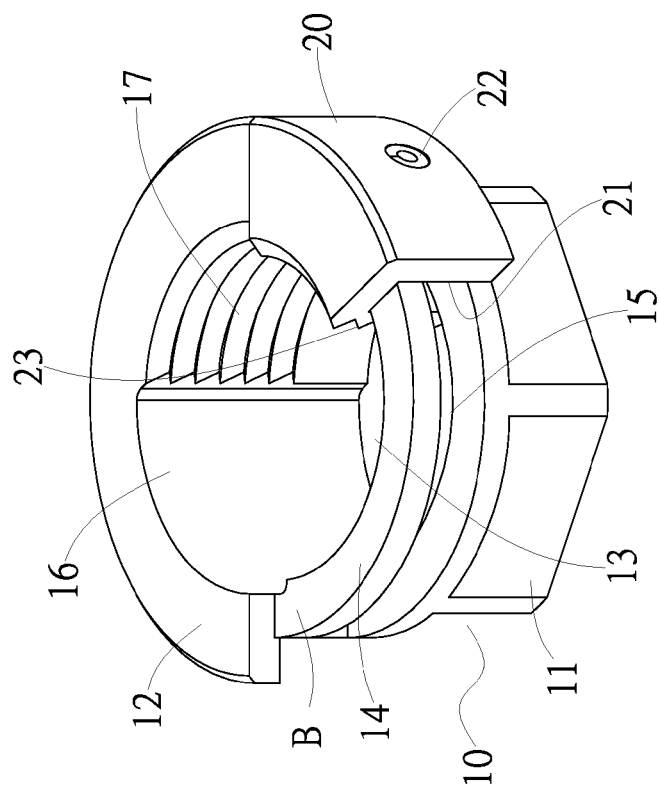
FIG. 3 is another perspective view showing the assembly of the locking and unlocking nut structure according to the preferred embodiment of the present invention.
Figure 5:
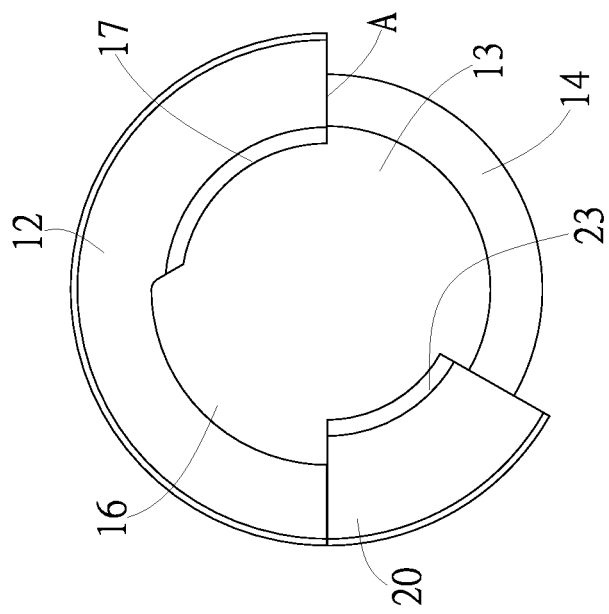
FIG. 5 is another plan view showing the assembly of the locking and unlocking nut structure according to the preferred embodiment of the present invention.
Figure 4:
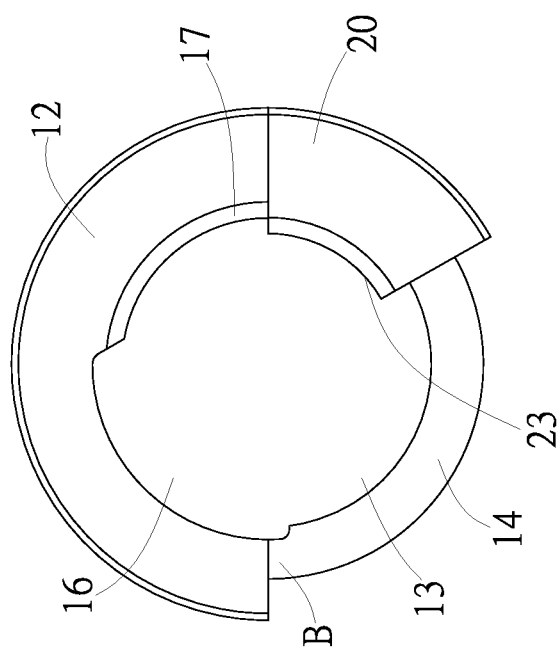
FIG. 4 is a plan view showing the assembly of the locking and unlocking nut structure according to the preferred embodiment of the present invention.
Figure 7:
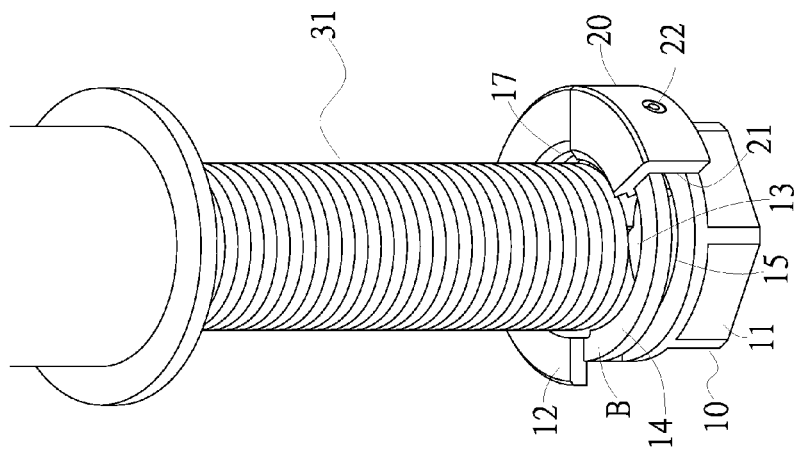
FIG. 7 is another perspective view showing the operation of the locking and unlocking nut structure according to the preferred embodiment of the present invention.
Figure 6:
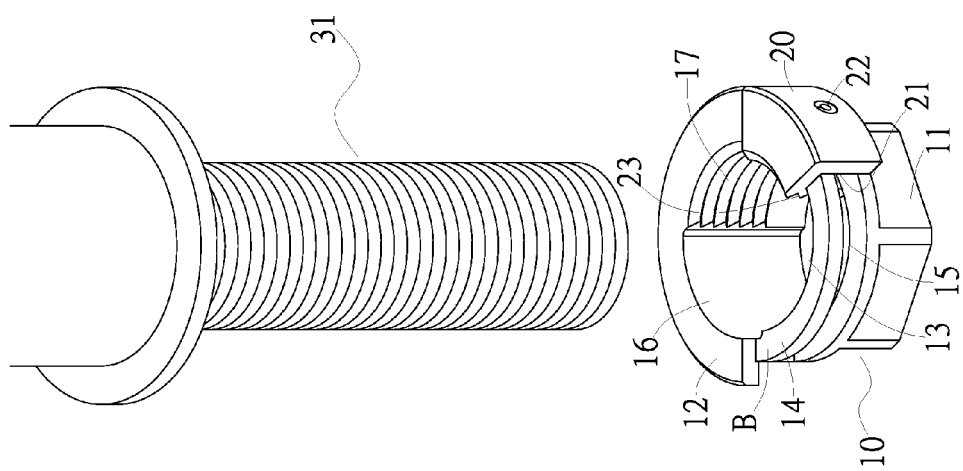
FIG. 6 is a perspective view showing the operation of the locking and unlocking nut structure according to the preferred embodiment of the present invention.
Figure 8:
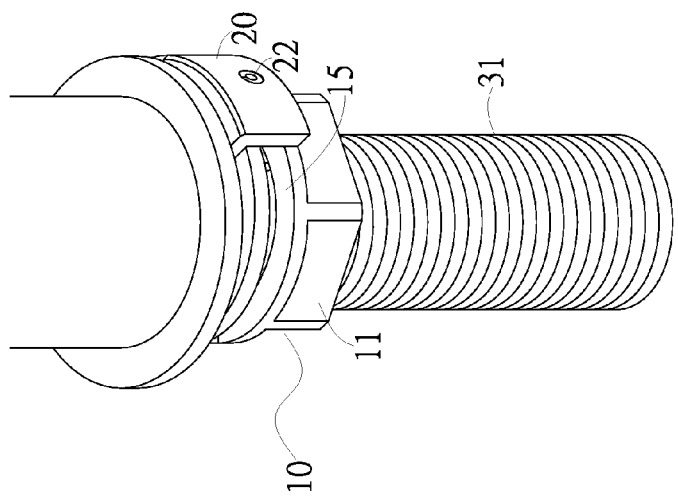
FIG. 8 is also another perspective view showing the operation of the locking and unlocking nut structure according to the preferred embodiment of the present invention.
Figure 9:
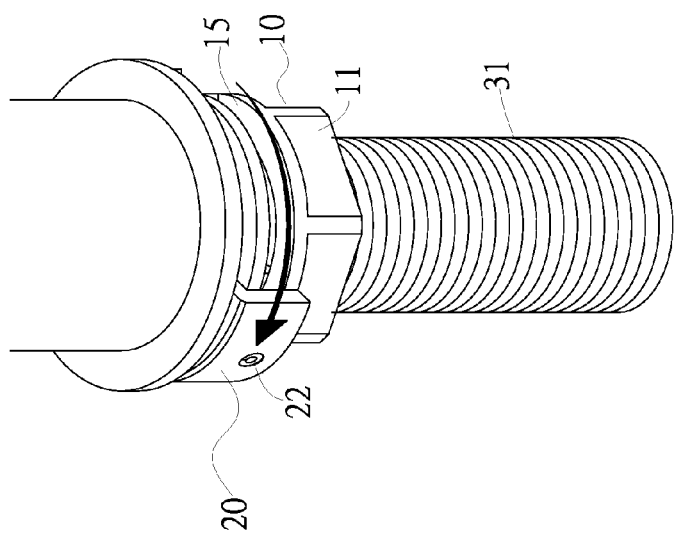
FIG. 9 is still another perspective view showing the operation of the locking and unlocking nut structure according to the preferred embodiment of the present invention.
Figure 10:
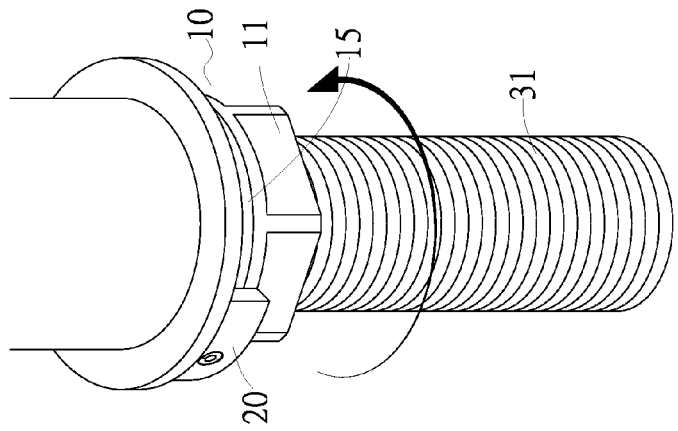
FIG. 10 is another perspective view showing the operation of the locking and unlocking nut structure according to the preferred embodiment of the present invention.
Figure 12:
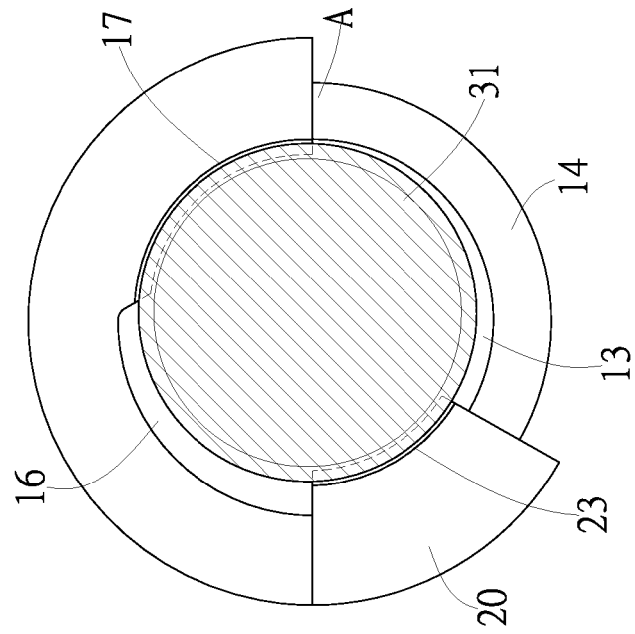
FIG. 12 is another cross sectional view showing the operation of the locking and unlocking nut structure according to the preferred embodiment of the present invention.
Figure 11:
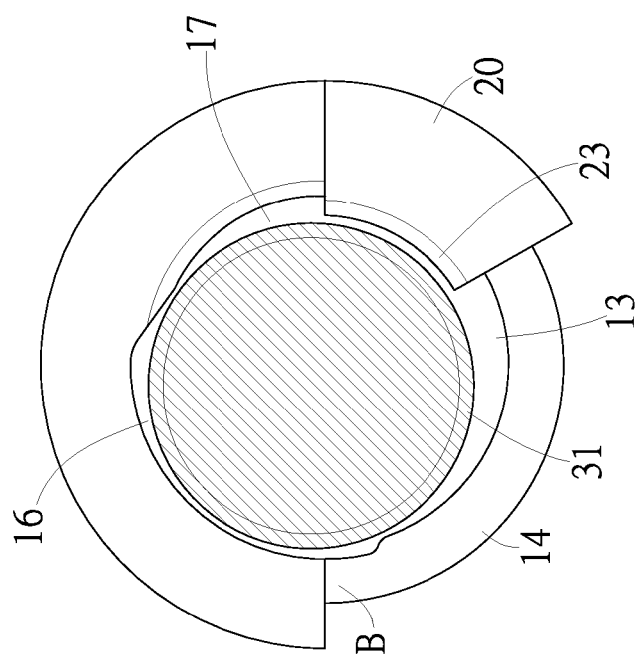
FIG. 11 is a cross sectional view showing the operation of the locking and unlocking nut structure according to the preferred embodiment of the present invention.
Figure 13:
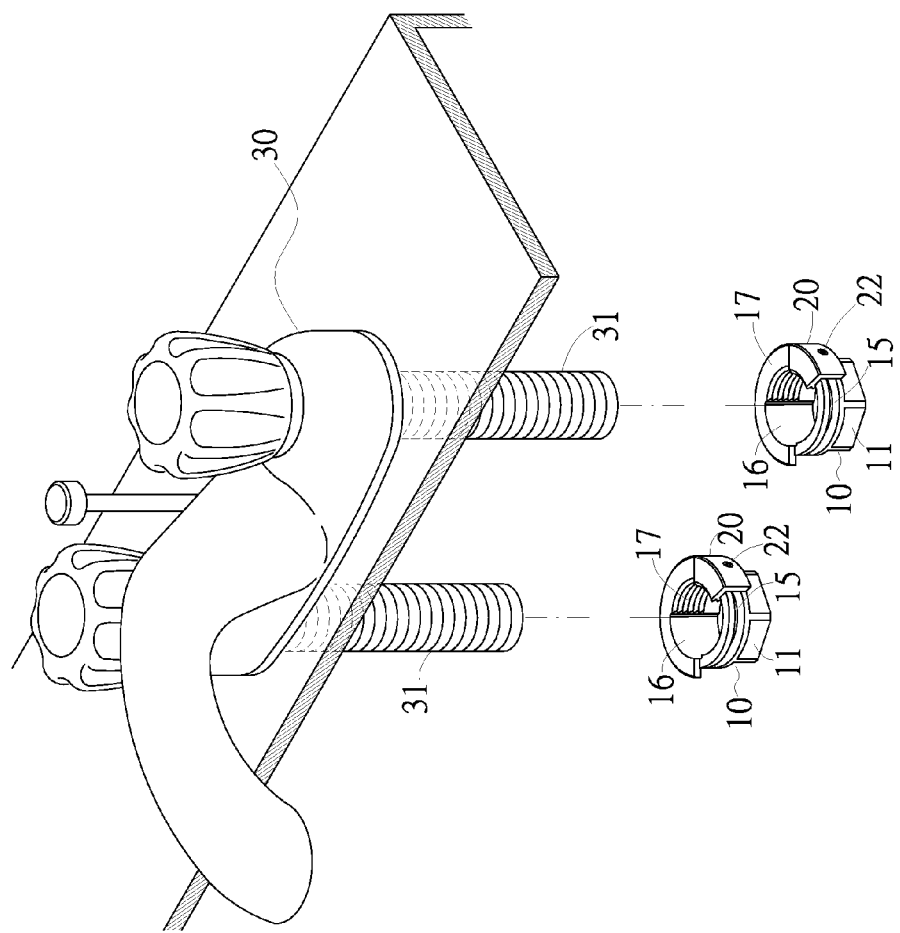
FIG. 13 is a perspective view showing the locking and unlocking nut structure of the present invention being applied in a water supply device.

FIG. 1 is a perspective view showing the exploded components of a locking and unlocking nut structure according to a preferred embodiment of the present invention. FIGS. 2 and 3 are a perspective view showing the assembly of the locking and unlocking nut structure according to the preferred embodiment of the present invention. FIGS. 4 and 5 are a plan view showing the assembly of the locking and unlocking nut structure according to the preferred embodiment of the present invention. FIGS. 6-10 are a perspective view showing the operation of the locking and unlocking nut structure according to the preferred embodiment of the present invention. FIGS. 11 and 12 are a cross sectional view showing the operation of the locking and unlocking nut structure according to the preferred embodiment of the present invention. FIG. 13 is a perspective view showing the locking and unlocking nut structure of the present invention being applied in a water supply device. The locking and unlocking nut structure of the present invention comprises a body 10 with a predetermined size, the body 10 includes a polygonal retaining section 11 formed around a lower end thereof to be retained by a tool such that the tool retains and rotates the polygonal retaining section 11 to lock or unlock the body 10. The body 10 also includes a circular face 12 defined on a top surface thereof and a through hole 13 passing therethrough axially, wherein a diameter of the through hole 13 is slightly larger than that of a screw rod (tube) 31 of the water supply device 30. The circular face 12 has a semi-circular recess 14 defined thereon, and the semi-circular recess 14 has a starting segment A defined on one end thereof and a stopping segment B defined on another end thereof, a top surface of the semi-circular recess 14 slopes increasingly from the starting segment A to the stopping segment B. The body 10 further includes a slot 15 formed around an upper end thereof relative to the semi-circular recess 14, wherein the slot 15 is recessed and has a predetermined depth or wherein the slot is an elongated hollow cut-out in the body 10. A slidable block 20 is formed in a C shape and is retained in the semi-circular recess 14 and has a C-shaped cutout 21, a width of which is larger than that of the semi-circular recess 14 so that the slidable block 20 moves in the semi-circular recess 14. The C-shaped cutout 21 of the slidable block 20 includes a bolt 22 for being inserted in the slot 15 or has an integrally formed projection (not shown) for being retained in the slot 15 so that the bolt 22 is guided by the slot 15 to move the slidable block 20 between the starting segment A and the stopping segment B of the semi-circular recess 14. The slidable block 20 includes first threads 23 defined on one of two outer surfaces thereof to match with second threads of the screw rod (tube) 31, the body 10 also includes an arcuate section 16 defined as a cut-out of predetermined shape along the inner wall of the through hole 13 wherein the location of the arcuate section 16 is opposite to the inner rim of the starting segment A of the semi-circular recess 14 so that while the slidable block 20 is fixed on the starting segment A of the semi-circular recess 14, a distance from the first threads 23 of the slidable block 20 to the arcuate section 16 of the through hole 13 is larger than an outer diameter of the screw rod (tube) 31 so as to move the screw rod (tube) 31 easily. The body 10 also includes an diameter-decreased screw section 17 defined on the inner wall of the through hole 13 thereof opposite to on an inner rim of the stopping segment B of the semi-circular recess 14 so that while the slidable block 20 is fixed on the stopping segment B of the semi-circular recess 14, a distance from the first threads 23 to the diameter-decreased screw section 17 of the through hole 13 is equal to the outer diameter of the screw rod (tube) 31.

Thereby, the slidable block 20 is moved toward different position of the semi-circular recess 14 to obtain different adjusted pitches of the through hole 13 to screw and unscrew the screw rod (tube) 31 by ways of the arcuate section 16 and the diameter-decreased screw section 17 of the through hole 13 respectively.

For example, as screwing the screw rod (tube) 31 of the water supply device with the nut structure, the slidable block 20 is pushed to the starting segment A of the semi-circular recess 14 so that a first adjusted pitch of the through hole 13 is larger than the outer diameter of the screw rod (tube) 31, hence the screw rod (tube) 31 is fitted into the through hole 13 and is further pushed toward a screwing position, then the slidable block 20 is pushed toward the stopping segment B of the semi-circular recess 14 to match with the top surface of the semi-circular recess 14 which slopes increasingly from the starting segment A to the stopping segment B so that the first threads 23 of the slidable block 20 and the diameter-decreased screw section 17 retain with the second threads of the screw rod (tube) 31, thereafter the tool (not shown) retains the polygonal retaining section 11 of the body 10 to screw the nut structure so that the nut structure locks the screw rod (tube) 31 securely, thus locking the water supply device 30.

As unscrewing the nut structure from the screw rod (tube) 31 of the water supply device, the tool (not shown) retains the polygonal retaining section 11 of the body 10 and rotates the polygonal retaining section 11 releasably so that the slidable block 20 is pushed toward the starting segment A from the stopping segment B to unscrew the nut structure from the screw rod (tube) 31, hence the nut structure is unlocked from the screw rod (tube) 31 quickly to unlock the water supply device 30.

Thereby, the nut structure of the present invention is capable of locking the screw rod (tube) with the water supply device and unlocking the screw rod (tube) from the water supply device quickly and easily in a limited operation space.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A locking and unlocking nut structure comprising:
    a body including a through hole passing therethrough axially, a diameter of the through hole being larger than that of a screw rod, the body also including a semi-circular recess defined on a top surface thereof, and the semi-circular recess having a starting segment defined on one end thereof and a stopping segment defined on another end thereof, the body further including a slot formed around an upper end thereof relative to the semi-circular recess and a diameter-decreased screw section defined on the inner wall of the through hole thereof opposite to the stopping segment of the semi-circular recess;
    a slidable block formed in a C shape and retained in the semi-circular recess and guided by the slot to move between the starting segment and the stopping segment of the semi-circular recess, the slidable block including first threads defined on one of two outer surfaces thereof, while the slidable block is fixed on the starting segment of the semi-circular recess, a distance from the first threads of the slidable block to an inner wall of the through hole is larger than an outer diameter of the screw rod; while the slidable block is fixed on the stopping segment of the semi-circular recess, a distance from the first threads to the diameter-decreased screw section of the through hole is equal to the outer diameter of the screw rod;
    the screw rod including second threads to match with the diameter-decreased screw section and the first threads of the slidable block.

2. The locking and unlocking nut as claimed in claim 1, wherein the body also includes an arcuate section defined on an inner wall of the through hole, and wherein the location of the arcuate section is opposite to the starting segment of the semi-circular recess.

3. The locking and unlocking nut as claimed in claim 1, wherein the body also includes an arcuate section defined on the inner rim of the starting segment of the semi-circular recess.

4. The locking and unlocking nut as claimed in claim 1, wherein the slot is an elongated hollow cut-out in the body.

5. The locking and unlocking nut as claimed in claim 1, wherein the slot is recessed and has a predetermined depth.

6. The locking and unlocking nut as claimed in claim 1, wherein the slidable block includes a bolt for being inserted in the slot so that the bolt is guided by the slot to move the slidable block.

7. The locking and unlocking nut as claimed in claim 1, wherein the slidable block includes an integrally formed projection for being retained in the slot so that the bolt is guided by the slot to move the slidable block.

8. The locking and unlocking nut as claimed in claim 1, wherein the body includes a polygonal retaining section formed around a lower end thereof to be retained by a tool.

9. The locking and unlocking nut as claimed in claim 1, wherein the body also includes a circular face defined on a top surface thereof, and the circular face has the semi-circular recess defined thereon.

10. The locking and unlocking nut as claimed in claim 1, wherein a top surface of the semi-circular recess slopes increasingly from the starting segment to the stopping segment.

\* \* \* \* \*